United States Patent
DeBellis (10) Patent No.: US 11,139,643 B1
(45) Date of Patent: Oct. 5, 2021

(54) DRILL POWERED WIRE PULLER

(71) Applicant: Electrical Product Innovation, Inc., Canyon Lake, CA (US)

(72) Inventor: Thomas DeBellis, Canyon Lake, CA (US)

(73) Assignee: Tommy D Electrical Products, LLC, Canyon Lake, CA (US)

(*) Notice: Subject to any disclaimer, the term of this patent is extended or adjusted under 35 U.S.C. 154(b) by 569 days.

(21) Appl. No.: 16/102,591

(22) Filed: Aug. 13, 2018

Related U.S. Application Data (63) Continuation of application No. 29/603,787, filed on May 12, 2017, now Pat. No. Des. 842,063.

(51) Int. Cl.
*H02G 1/08* (2006.01)
*B65H 75/30* (2006.01)

(52) U.S. Cl.
CPC .......... *H02G 1/085* (2013.01); *B65H 75/305* (2013.01)

(58) Field of Classification Search
CPC . H02G 1/00; H02G 1/04; H02G 1/085; B65H 75/305; B65H 2555/00; B65H 2555/40
See application file for complete search history.

(56) References Cited

U.S. PATENT DOCUMENTS

| | | |
|---|---|---|
| D152,067 S | 12/1948 | Curtis |
| 2,489,319 A | 11/1949 | Nave, Jr. et al. |
| 3,185,399 A | 5/1965 | Pellicciotti |
| 3,190,616 A | 6/1965 | Oleson |
| 3,610,582 A | 10/1971 | Passoni |
| 3,968,952 A | 7/1976 | Newell |
| 3,985,188 A | 10/1976 | Steele |
| 4,196,864 A | 4/1980 | Cole |
| 4,270,734 A | 6/1981 | Straight |
| 4,290,584 A | 9/1981 | Eckels et al. |
| 4,456,225 A | 6/1984 | Lucas |
| 4,497,470 A | 2/1985 | Carter et al. |
| 4,951,890 A | 8/1990 | Sossamon |
| 4,956,889 A | 9/1990 | Kirk |
| D322,557 S | 12/1991 | Cummings |
| D322,920 S | 1/1992 | Wolfe |

(Continued)

FOREIGN PATENT DOCUMENTS

WO 99/60295 A2 11/1999

OTHER PUBLICATIONS

Notice of Allowance dated Mar. 13, 2019, U.S. Appl. No. 16/119,885.

*Primary Examiner* — Lee D Wilson
(74) *Attorney, Agent, or Firm* — Rutan & Tucker, LLP (57) ABSTRACT

Apparatus for a drill powered wire puller are disclosed. In an embodiment the drill powered wire puller includes a center plate, a cradle plate, a housing, a support, the support including a receiver, and a capstan. The center plate is coupled with the cradle plate at a proximal end. The cradle plate includes a U-shaped notch and two hooks or catches which are configured to couple the cradle plate with a powered rotary tool, such as a drill. The right side of the center plate is coupled with a housing, the left side of the center plate is coupled with a support. The left side of the support is coupled with a capstan. The outer perimeter of the capstan includes notches that define at least one "cleat" shape in the outer perimeter.

20 Claims, 10 Drawing Sheets

(56) References Cited

U.S. PATENT DOCUMENTS

| | | | |
|---|---|---|---|
| 5,149,056 | A | 9/1992 | Jones |
| 5,277,350 | A | 1/1994 | Thornbury, Jr. |
| 5,322,397 | A | 6/1994 | Spear |
| D348,758 | S | 7/1994 | Lichtenvort |
| 5,376,035 | A | 12/1994 | Forrest |
| 5,464,193 | A | 11/1995 | Wrate |
| 5,509,489 | A | 4/1996 | Lower, Jr. |
| 5,820,317 | A | 10/1998 | Van Troba |
| 5,863,160 | A | 1/1999 | Havener |
| 5,885,036 | A | 3/1999 | Wheeler |
| 5,984,273 | A * | 11/1999 | Ray .................. H02G 1/08 254/134.3 R |
| 6,286,815 | B1 | 9/2001 | Ray |
| 6,361,021 | B1 | 3/2002 | Brennan |
| 6,386,512 | B1 | 5/2002 | Pecot et al. |
| 6,431,524 | B1 * | 8/2002 | Weber .................. H02G 1/08 254/134.3 FT |
| 6,467,755 | B2 | 10/2002 | Reilly et al. |
| D468,100 | S | 1/2003 | Bowling |
| 6,533,248 | B1 | 3/2003 | Schafer |
| 6,682,050 | B1 | 1/2004 | Ray |
| 6,705,597 | B1 | 3/2004 | Reilly et al. |
| D489,157 | S | 4/2004 | Lawson |
| D513,650 | S | 1/2006 | Elliott |
| 7,278,808 | B1 | 10/2007 | Sisk, Sr. et al. |
| 7,309,060 | B2 | 12/2007 | Baughman et al. |
| 7,357,612 | B1 | 4/2008 | Paul |
| 7,410,336 | B2 | 8/2008 | Parks |
| 7,588,109 | B2 | 9/2009 | Wachendorf et al. |
| 7,712,726 | B1 | 5/2010 | Jernigan |
| 7,789,375 | B2 | 9/2010 | Ying |
| 8,056,884 | B2 | 11/2011 | LaFreniere |
| D682,073 | S | 5/2013 | Payne |
| D748,446 | S | 2/2016 | Fretz |
| D751,880 | S | 3/2016 | Howell |
| D775,448 | S | 12/2016 | Fretz |
| D776,507 | S | 1/2017 | Faverio et al. |
| 10,294,067 | B1 * | 5/2019 | DeBellis .............. B65H 75/406 |
| 2002/0043657 | A1 | 4/2002 | Ray |
| 2003/0075711 | A1 | 4/2003 | Cook et al. |
| 2003/0098450 | A1 | 5/2003 | Cook et al. |
| 2007/0284559 | A1 | 12/2007 | Plummer |
| 2011/0057157 | A1 | 3/2011 | Holley |
| 2011/0079967 | A1 | 4/2011 | Presley |
| 2014/0001427 | A1 | 1/2014 | Fretz et al. |

* cited by examiner

DRILL POWERED WIRE PULLER

CROSS-REFERENCE TO RELATED APPLICATIONS

This application is continuation of U.S. patent application Ser. No. 29/603,787 filed May 12, 2017, the entire contents of which are incorporated by reference herein.

FIELD

Embodiments of the disclosure relate to the field of tools. More specifically, an aspect of the invention relates to an apparatus for improved wire pulling devices, which can be coupled with powered rotary tools, such as handheld powered drills.

GENERAL BACKGROUND

The drill powered wire puller may be attached to a powered rotary tool, such as a handheld drill.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Terminology

In the following description, certain terminology is used to describe aspects of the invention. In other instances, specific numeric references such as "a first component," may be made. However, the specific numeric reference should not be interpreted as a literal sequential order but rather interpreted that the "first component" is different than a "second component." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Figure 1:
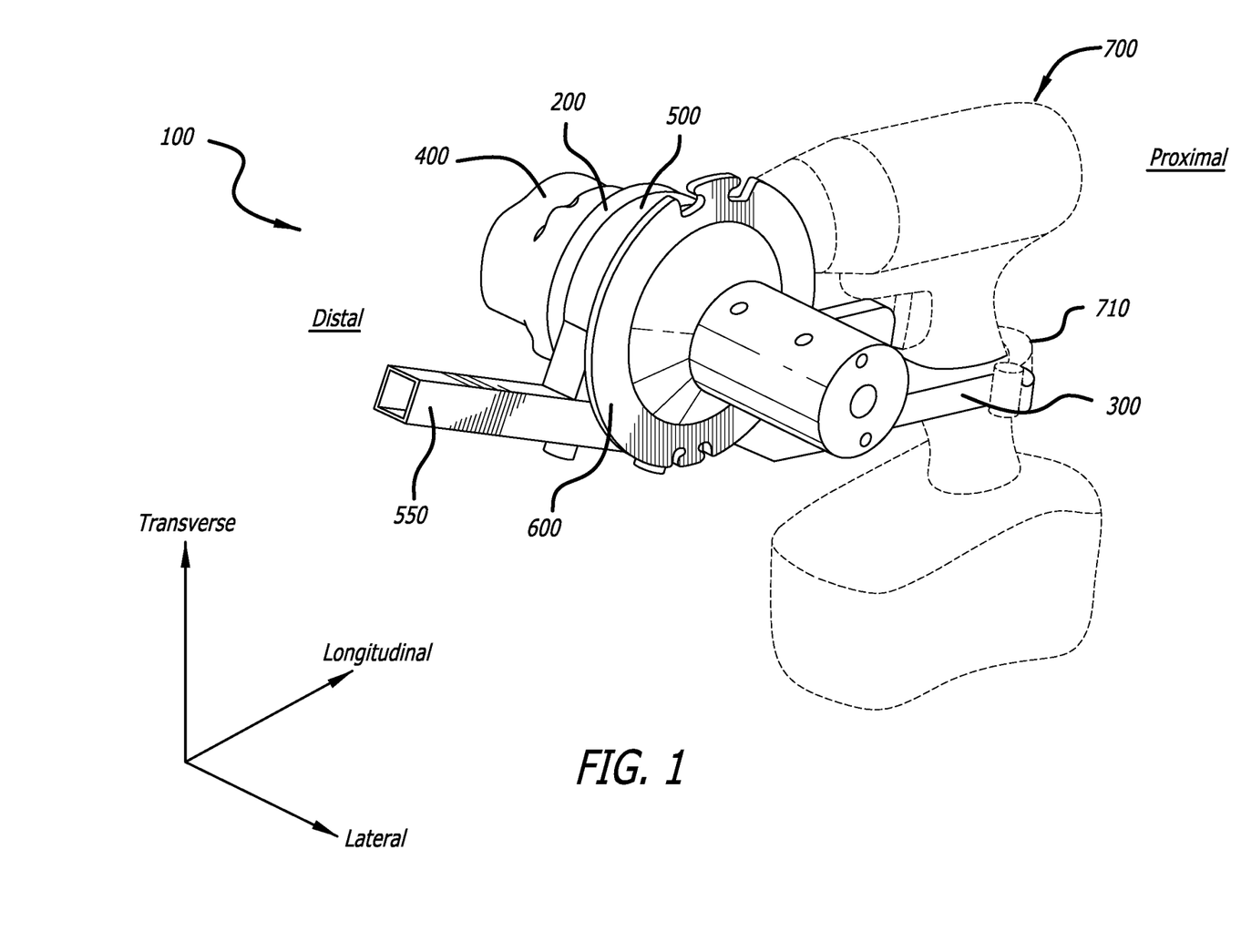
FIG. 1 is a top front perspective view for a drill powered wire puller shown in an environment of use.
Figure 2:
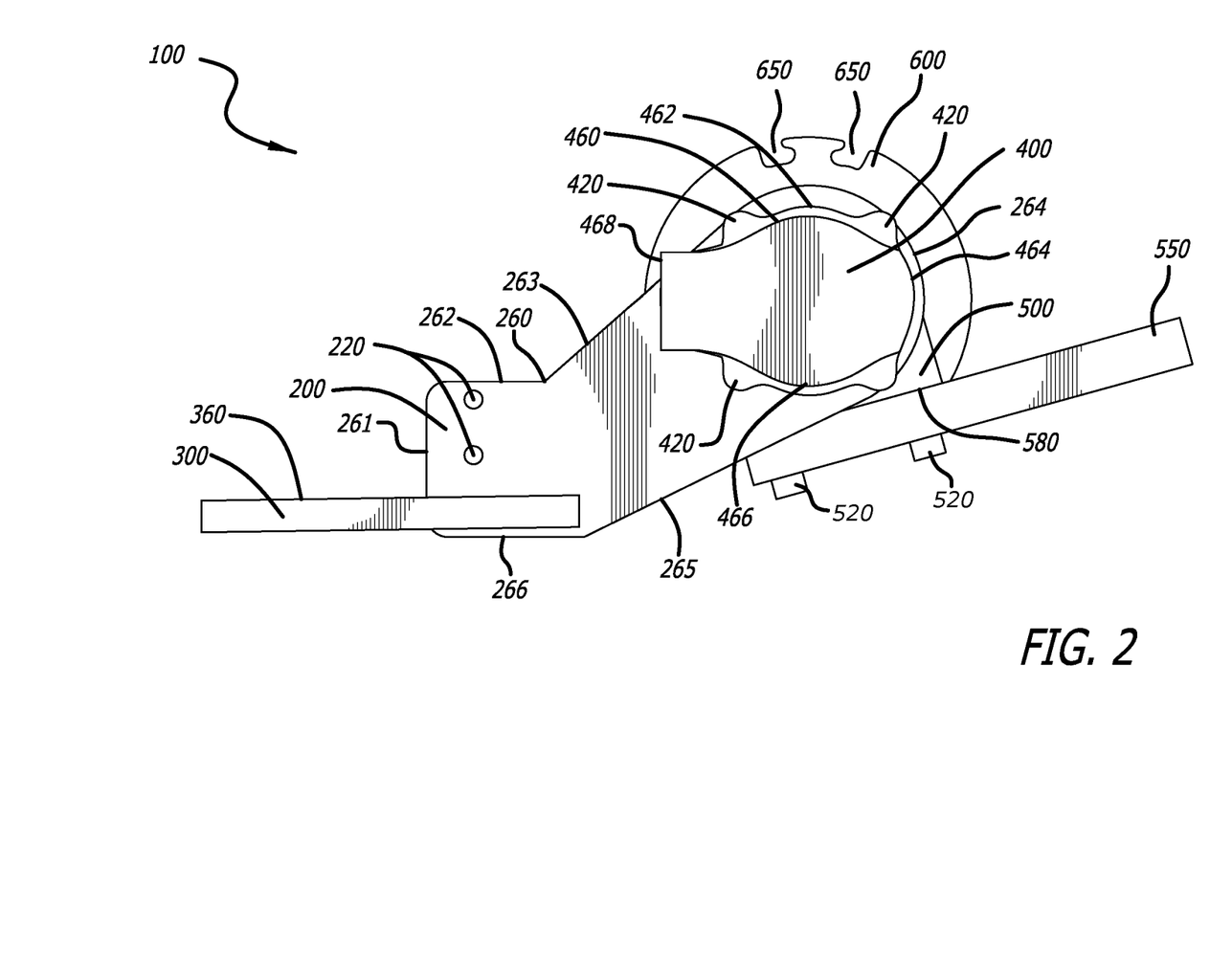
FIG. 2 is a right-side view thereof.
Figure 3:
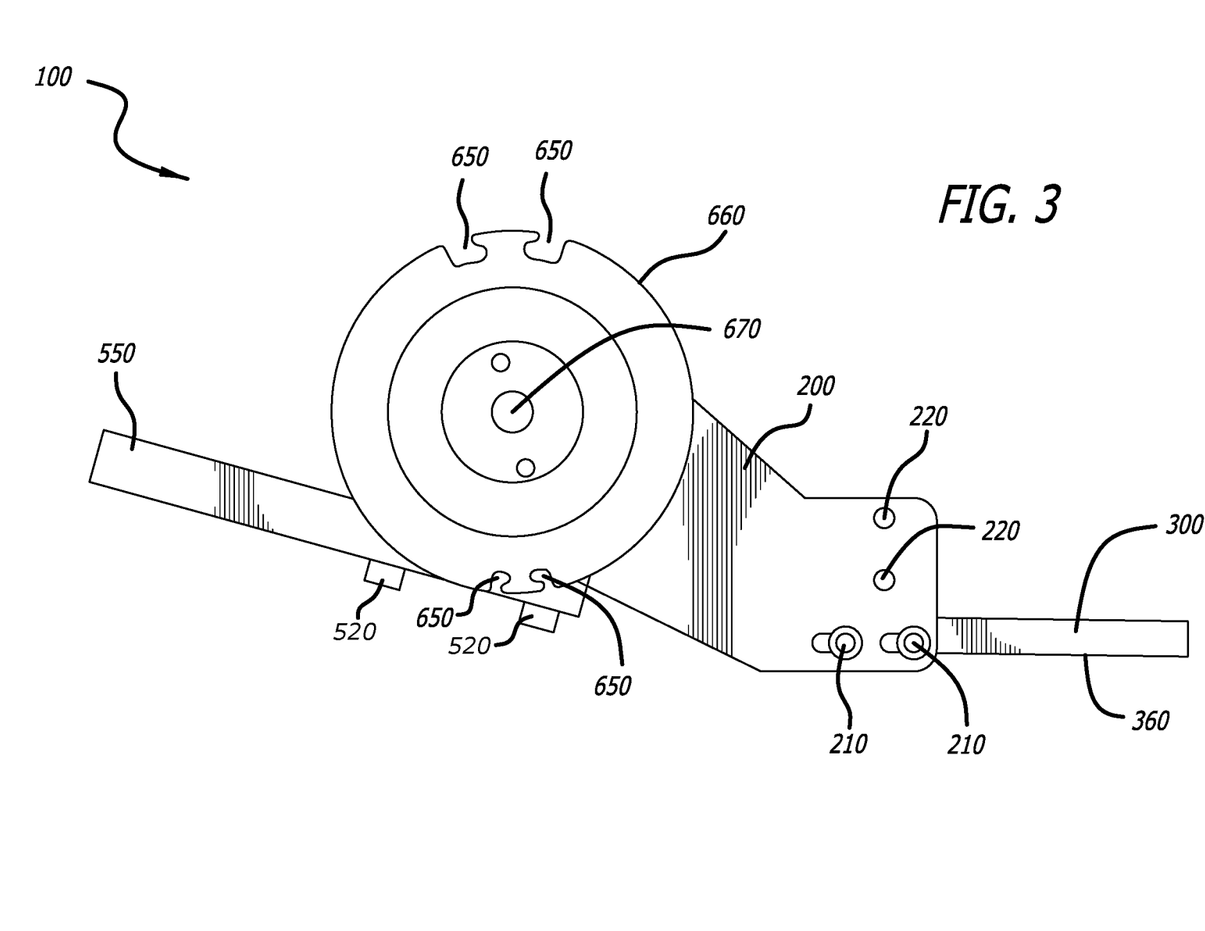
FIG. 3 is a left-side view thereof.
Figure 4:
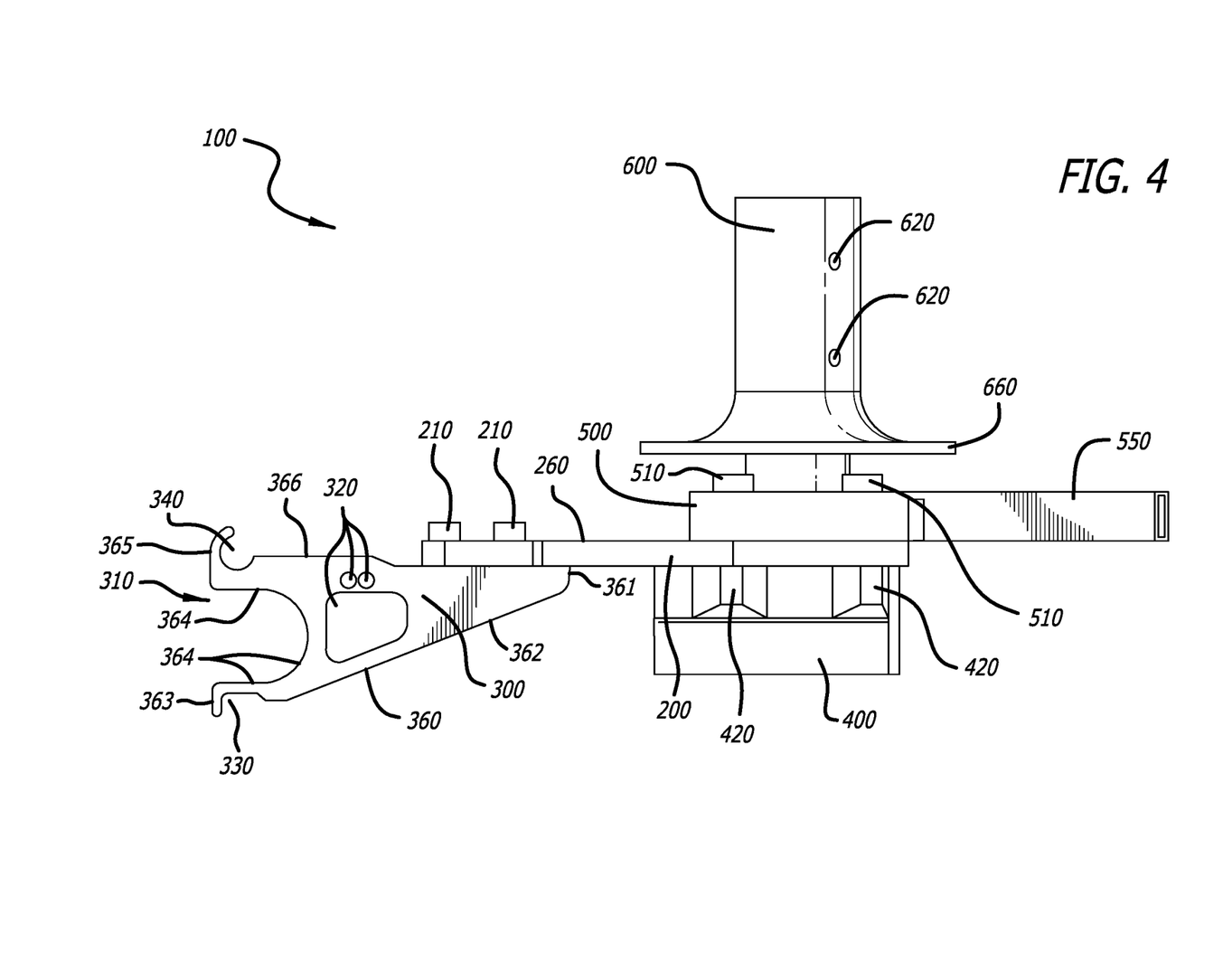
FIG. 4 is a top view thereof.

To assist in the description of the components of the drill powered wire puller, a "longitudinal axis" extends from a rear end to a front end of the device, and is generally horizontal to the device when viewed from a right-side, left-side, or top view of the device, e.g. FIGS. 2, 3, and 4. A "lateral axis" is normal to the longitudinal axis when viewed from a top view of the device, e.g. FIG. 4. A "transverse axis" extends normal to both the longitudinal and lateral axes. Also, the terms "proximal" and "distal," used to describe the wire puller and its components, are used in reference to the powered drill, shown in FIG. 1. Accordingly, a "distal" end is commensurate with a "front" end, and a "proximal" end is commensurate with a "rear" end.

Lastly, in certain situations the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Drill Powered Wire Puller Device

Referring to FIGS. 1-10, an exemplary apparatus of a drill powered drill powered wire puller 100 is shown. The drill powered wire puller 100 may feature a center plate 200, a cradle plate 300, a housing 400, a support 500, a receiver 550, and a capstan 600.

Figure 6:
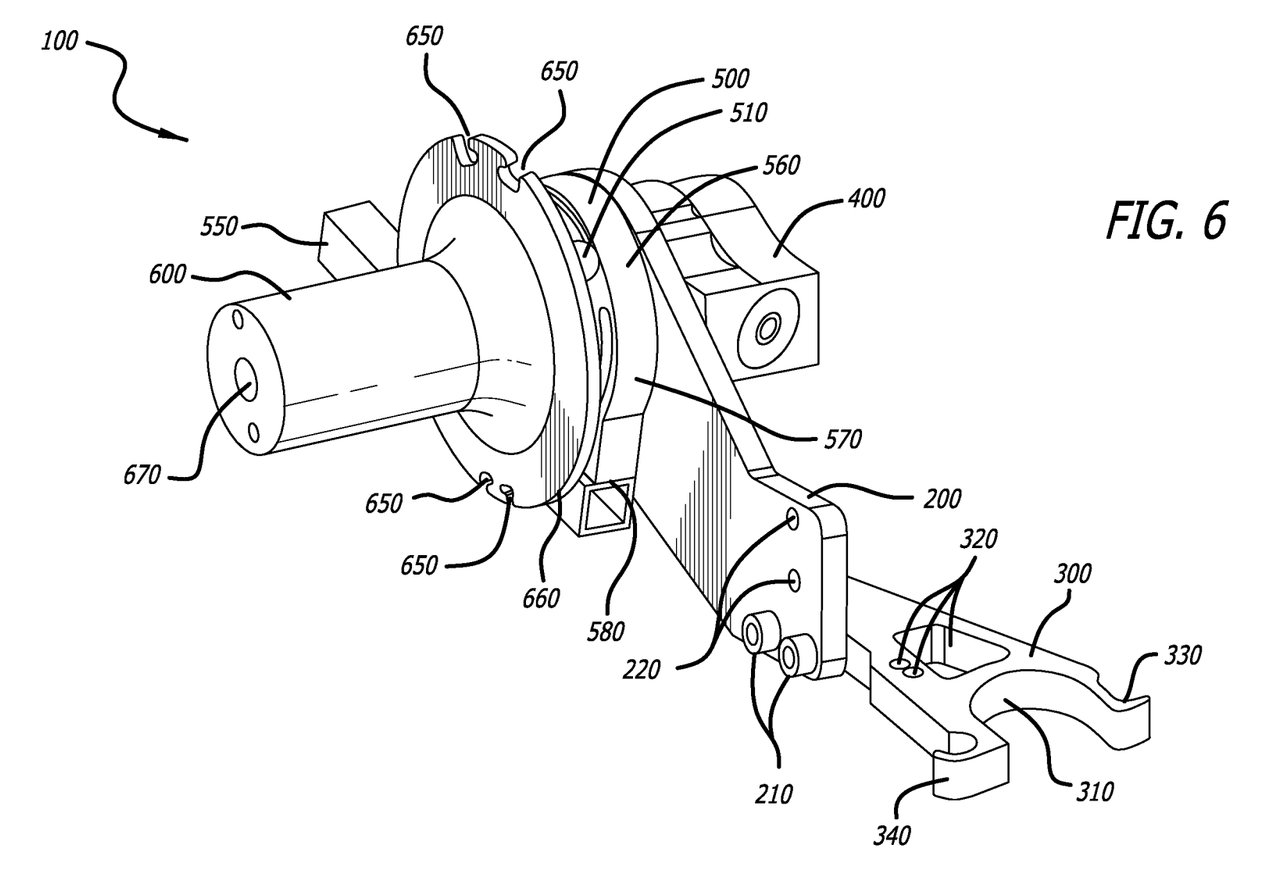
FIG. 6 is a top rear perspective view thereof.
Figure 7:
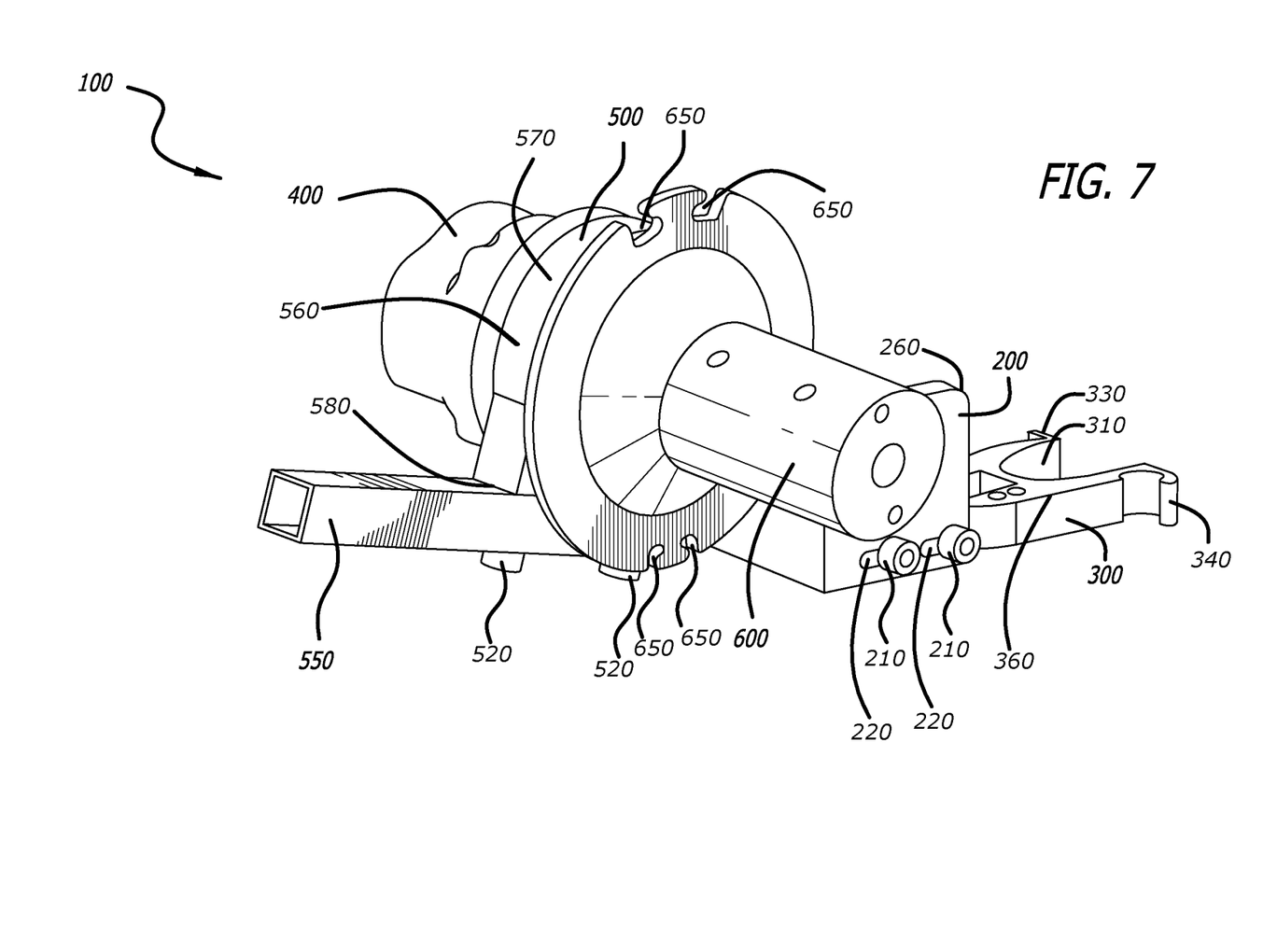
FIG. 7 is a right front perspective view thereof.
Figure 8:
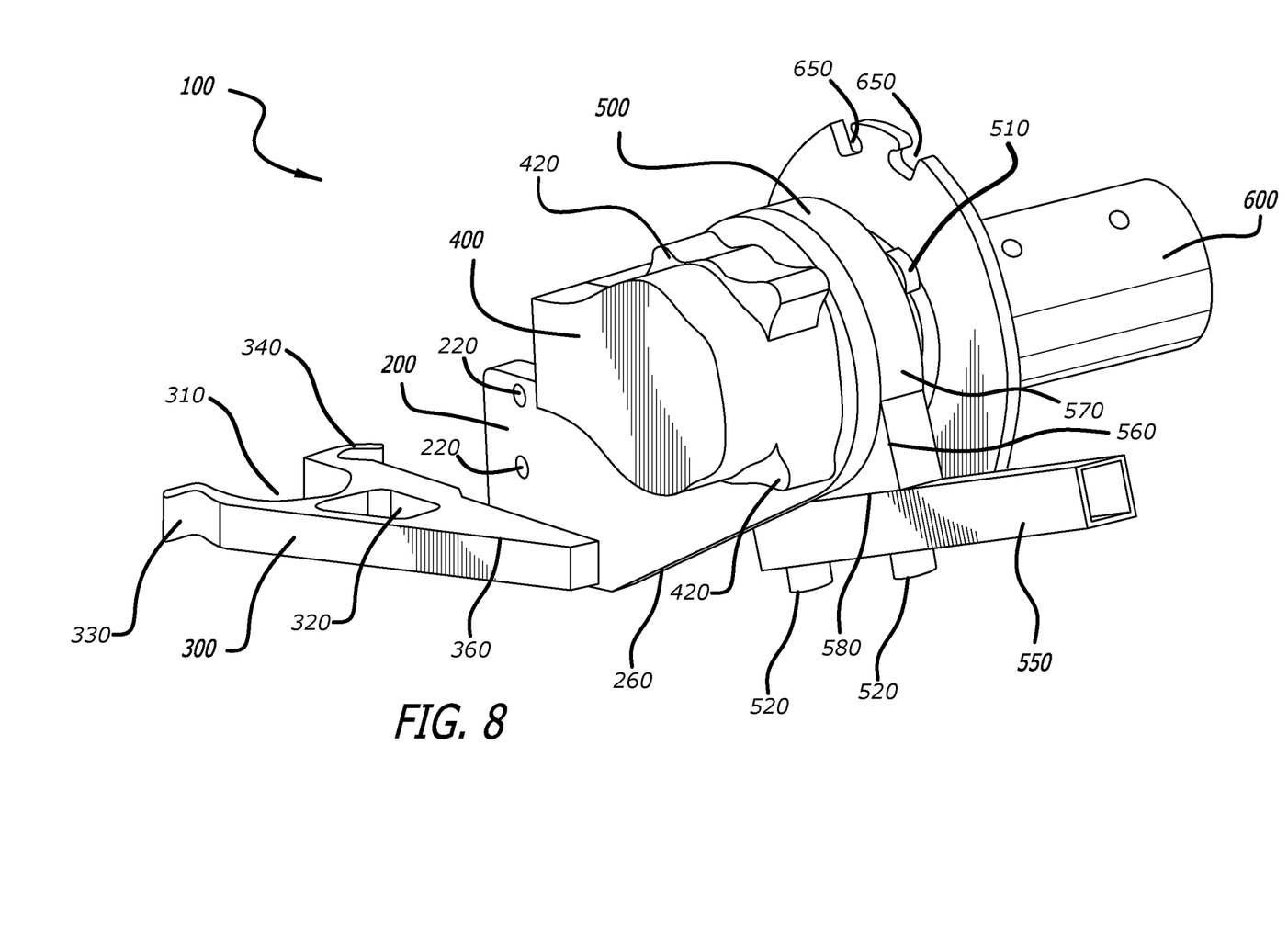
FIG. 8 is a front right perspective view thereof.

The center plate 200 extends along a plane defined by the longitudinal and transverse axes. The center plate 200 is coupled at a proximal end with a cradle plate 300. The cradle plate 300 extending along a plane perpendicular to the center plate 200, defined by the longitudinal and lateral axes. The cradle plate 300 may be coupled to the center plate 200 using one or more socket cap bolts 210, as shown in FIG. 3. Center plate 200 includes apertures 220 in a proximal end traversing the center plate 200 along a lateral axis. Two of the apertures 220 may define an oblong cross-sectional shape, two of the apertures may define a circular cross-section. The cradle plate 300 includes a U-shaped notch 310 in a proximal end, as shown in FIG. 6. The cradle plate 300 includes apertures 320 traversing the cradle plate 300 along a transverse axis. The cradle plate 300 includes a first hook or catch 330 and a second hook or catch 340 disposed at a proximal end, either side of the U-shaped notch 310.

The center plate 200 is defined by a perimeter 260 as shown in FIG. 2. When viewed from a side view, the perimeter 260 is formed by a first section 261 of the center plate 200 extends from a proximal lower corner of the center plate 200 transversely upwards, a second section 262 extends longitudinally distally before a third section 263 extending upwards and distally at an acute angle relative to the longitudinal axis. The perimeter 260 is further formed by a fourth section 264 with an arc-shaped of substantially 180° with a fifth section 265 extending proximally at an acute angle to the longitudinal axis and a sixth section 266 extending proximally parallel to the longitudinal axis to a proximal lower corner of the center plate 200.

The cradle plate 300 is defined by a perimeter 360. When viewed from a top view, e.g. FIG. 4, a first section 361 of the perimeter 360 extends from a distal corner adjacent to center plate 200 and extends, perpendicular to the center plate 200, along a lateral axis. A second section 362 of the perimeter 360 then extends proximally, and laterally away from the center plate 200, at an acute angle to the longitudinal axis, the perimeter 360 then defines a first hook 330 at a proximal corner furthest from the center plate 200. A third section 363 of the perimeter 360 then extends laterally towards a central longitudinal axis defined by the center plate 200. A fourth section 364 of the cradle plate perimeter 360 then extends longitudinally distal and then curves through an arc of substantially 180° and extends longitudinally proximally to define a U-shaped notch 310. A fifth section 365 of the perimeter 360 then extends laterally towards a central axis and then defines a second hook 340. A sixth section 366 of the perimeter 360 extends longitudinally distally towards the distal corner adjacent to the center plate 200.

The housing 400 is coupled to a right (lateral) side of the center plate 200, adjacent a distal end, and extends along a lateral axis away from the center plate 200. As illustrated in FIG. 2, from a right side view, the top 462 and bottom 466 edges of the housing outer perimeter 460 define a substantially circular shape. The proximal 468 and distal 464 edges of the housing perimeter 460 protrude beyond the substantially circular diameter defined by the top 462 and bottom 466 edges, the proximal edge 468 protruding more than the distal 464 edge. The housing 400 further includes four protrusions 420 extending beyond the substantially circular shape defined by the top 462 and bottom 466 edges, and are adjacent the center plate 200.

Figure 5:
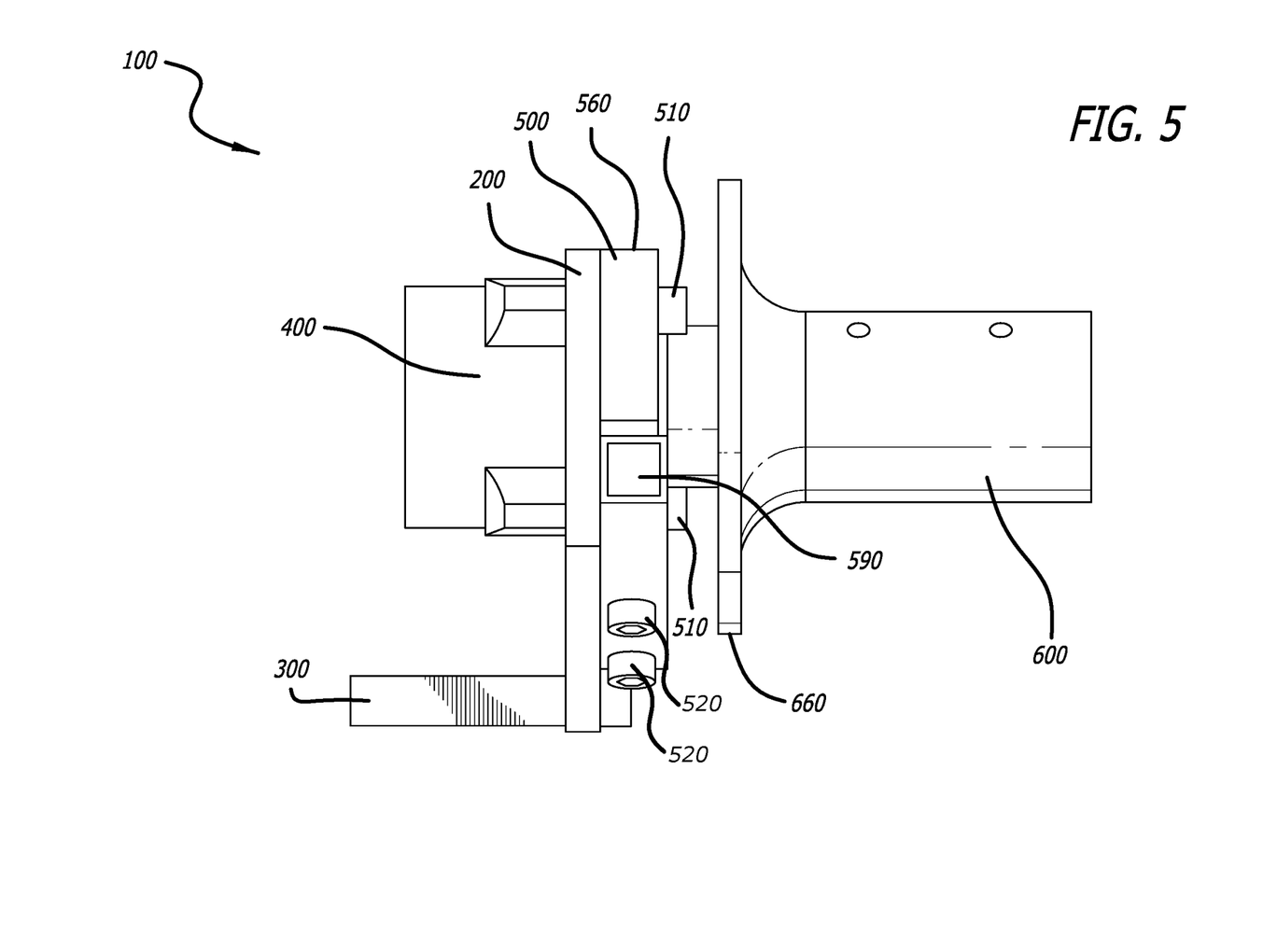
FIG. 5 is a front view thereof.

A support 500 is coupled with a left side of the center plate 200 and extends laterally away from the center plate 200. As shown in FIG. 5, the support 500 is coupled with the center plate 200 using socket cap bolts 510. The support outer perimeter 560 defines a substantially a circular outer edge defining an arc 570. A lower side of the perimeter 560 extends downwards beyond the diameter of the circle defined by arc 570 and defines a substantially straight lower edge 580. A receiver 550 can be coupled with the support 500 along the lower edge 580 using socket cap bolts 520. The receiver 550 is a tubular bar that defines an opening 590 with a square cross-sectional area. The receiver 550 can extend distally at an acute angle to the longitudinal axis.

A capstan 600 can extend laterally from a left side of the support 500. As best seen in FIGS. 3&6, from a left-side view, the capstan 600 defines a substantially circular outer perimeter 660 about a capstan center point 670. A central axis of the capstan 600 extends along a lateral axis through the capstan center point 670. The outer perimeter of the capstan 660 includes notches 650 extending radially inward to define one or more "cleat" shapes in the outer perimeter. The capstan 600 extends laterally from the support 500 in a radially symmetrical profile, about the capstan central axis. As best seen in FIG. 4, when viewed from a top side view, the radially symmetrical side profile of the capstan 600 extends laterally away from the support 500 before extending radially outward, perpendicular to the capstan central axis. The capstan then extends laterally away from the support 500 before extending radially inward. The side profile of the capstan 600 then extends radially inward and laterally outward to define a concave curve that arcs through substantially 90° before extending laterally outward, parallel to the lateral axis before terminating in a left-most surface of the capstan, perpendicular to the capstan central axis. A surface of the capstan 600 may include screw apertures 620.

As best seen in FIG. 1, in a preferred environment, the wire puller 100 is configured for coupling to a powered rotary tool, such as a handheld power drill 700. The U-shaped notch 310 of the cradle plate 300 can couple with a handle of the handheld power drill 700. The second hook 340 can receive a strap 710 that encircles a proximal edge of the handle of the handheld power drill 700.

Figure 9:
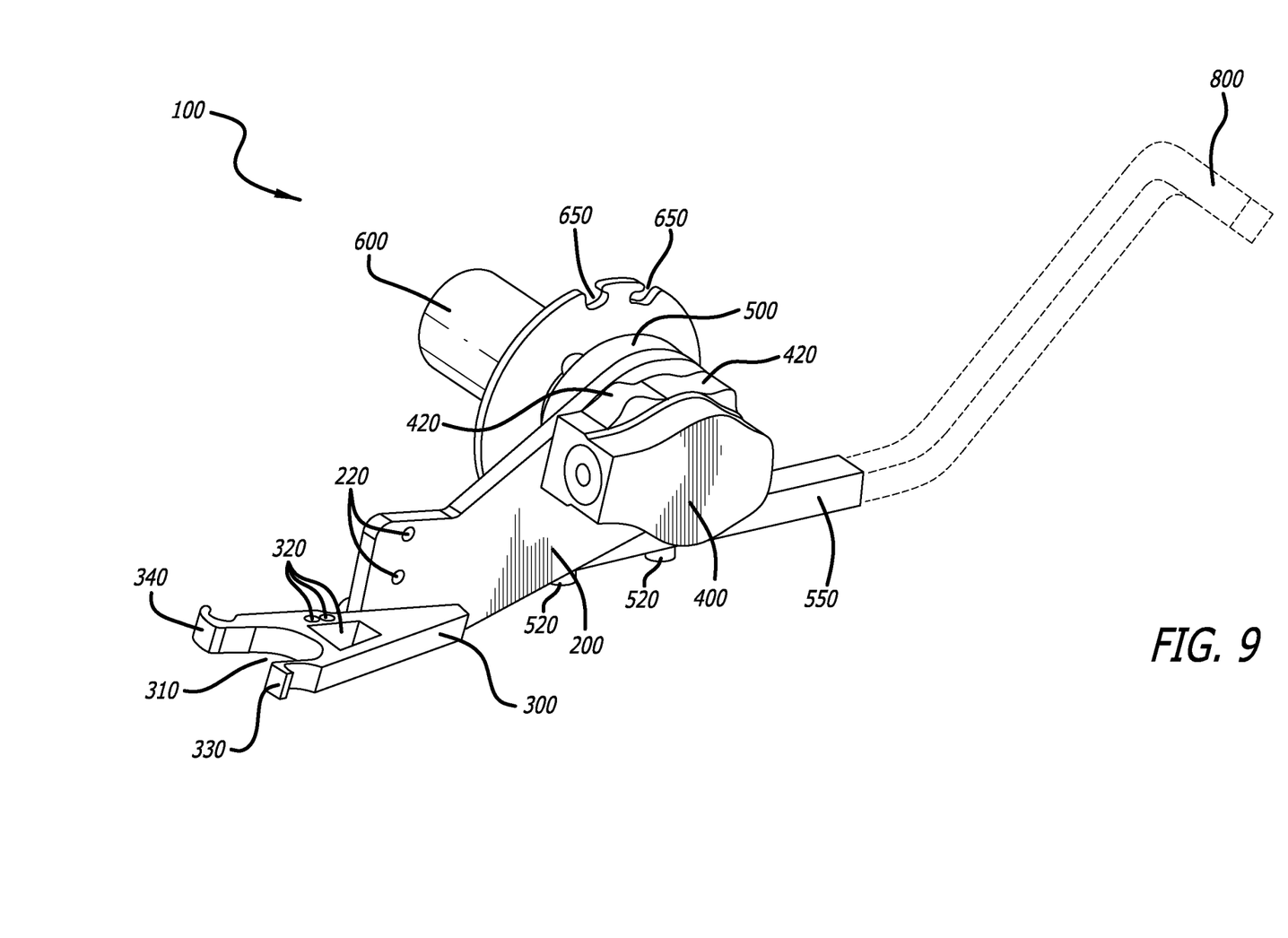
FIG. 9 is a right rear perspective view in an environment of use.
Figure 10:
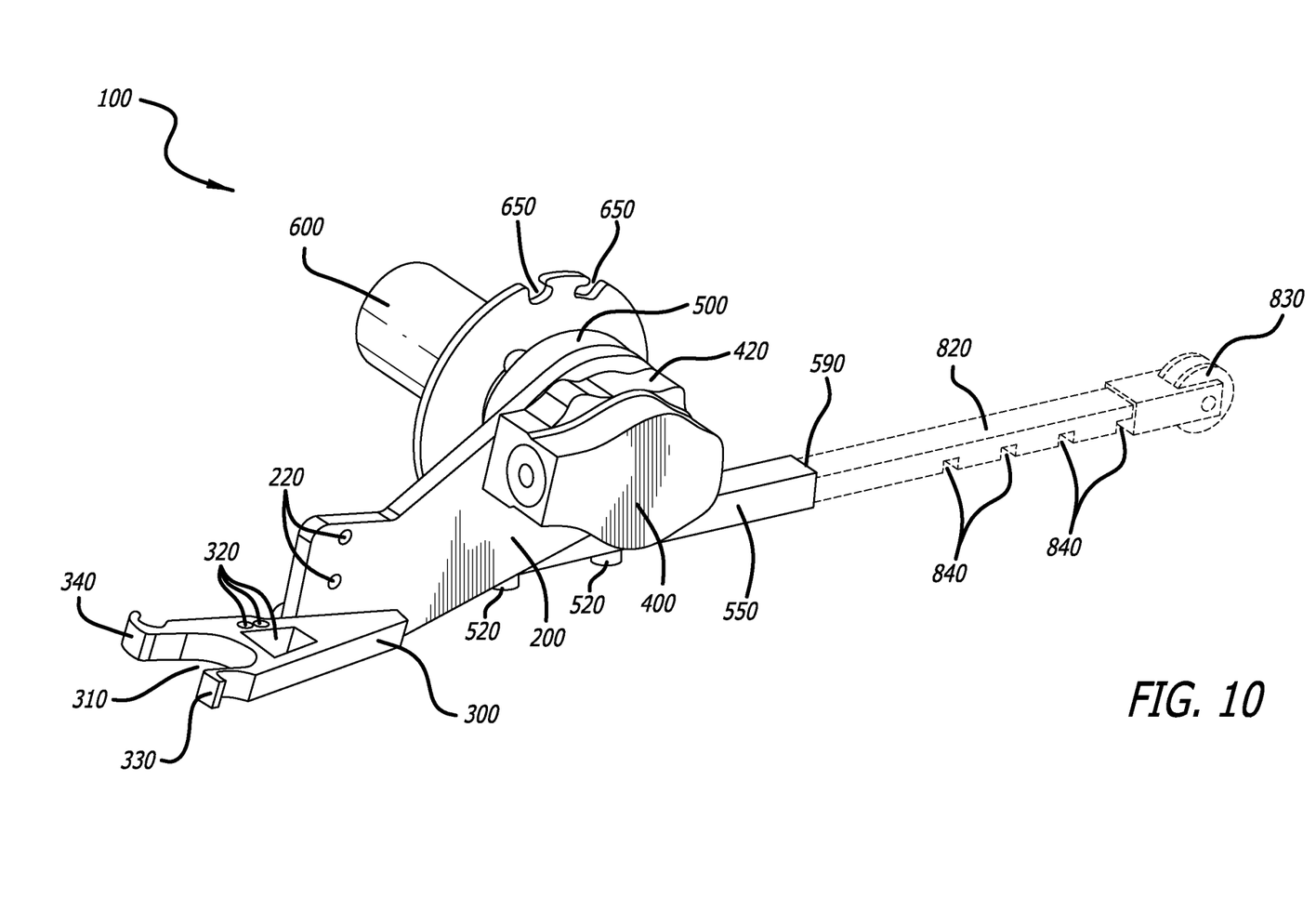
FIG. 10 is a right rear perspective view in an environment of use.

As best seen in FIGS. 9, 10, the receiver 550 may be coupled with different types of support arms 800 and 820. As specifically shown in FIG. 10, the support arm 820 includes a first end with an opening 590 into which the support arm 820 is inserted. The support arm 820 includes a spool member 830 at the second end. The support arm 820 includes four notches disposed on a lower side of arm and extending transversely upwards.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A drill powered wire puller, comprising:
   a center plate;
   a cradle plate;
   a support adapted to include a receiver;
   a housing; and
   a capstan,
   wherein the center plate extends along a plane defined by both a longitudinal axis and a transverse axis and the cradle plate is coupled with the center plate at a proximal end and extends proximally from the center plate along a plane defined by both the longitudinal axis and a lateral axis.

2. The drill powered wire puller of claim 1, wherein the longitudinal axis extends from a rear end to a front end of the drill powered wire puller, the lateral axis is perpendicular to the longitudinal axis, and the transverse axis extends perpendicular to both the longitudinal axis and the lateral axis.

3. The drill powered wire puller of claim 1, wherein the housing is coupled with a right side of the center plate and extends laterally away from the center plate.

4. The drill powered wire puller of claim 3, wherein the support is coupled with a left side of the center plate and extends laterally away from the center plate.

5. The drill powered wire puller of claim 3, wherein the capstan is coupled with a left side of the support and extends laterally away from the support.

6. The drill powered wire puller of claim 1, wherein the receiver is coupled with a bottom surface of the support.

7. The drill powered wire puller of claim 1, wherein the capstan defines a circular perimeter from a left side perspective view, the circular perimeter of the capstan including notches extending radially inward to define one or more cleat shapes in the outer perimeter.

8. The drill powered wire puller of claim 1, wherein cradle plate including a U-shaped notch configured to allow for insertion of a handle of a powered rotary tool, the cradle plate being coupled to the center plate.

9. The drill powered wire puller of claim 1, wherein a side profile of the capstan, when viewed from a top side view, extends radially inward from a circular perimeter of the capstan, and laterally outward from the support to define a radially symmetrical concave profile that arcs through ninety degrees.

10. The drill powered wire puller of claim 1, wherein the center plate is a single, contiguous member.

11. A drill powered wire puller, comprising:
   a center attachment member;
   a cradle member including a notch sized to allow for insertion of a handle of a powered rotary tool, the cradle member being coupled to the center attachment member;
   a support adapted to include a receiver;
   a housing; and
   a capstan,
   wherein the center attachment member extends along a plane defined by both a longitudinal axis and a transverse axis and the cradle member extends along a plane defined by both the longitudinal axis and a lateral axis.

12. The drill powered wire puller of claim 11, wherein the lateral axis extends substantially orthogonal to the transverse axis.

13. The drill powered wire puller of claim 11, wherein the longitudinal axis extends from a rear end to a front end of the drill powered wire puller, the lateral axis is perpendicular to the longitudinal axis, and the transverse axis extends perpendicular to both the longitudinal axis and the lateral axis.

14. The drill powered wire puller of claim 11, wherein the housing is coupled with a right side of the center attachment member and extends laterally away from the center attachment member.

15. The drill powered wire puller of claim 14, wherein the support is coupled with a left side of the center attachment member and extends laterally away from the center attachment member and in a direction opposite to the right side of the center attachment member.

16. The drill powered wire puller of claim 11, wherein the capstan is coupled with a left side of the support and extends laterally away from the support while the center attachment member is coupled to a right side of the support.

17. The drill powered wire puller of claim 11, wherein the receiver is coupled with a bottom surface of the support.

18. The drill powered wire puller of claim 11, wherein the capstan defines a circular perimeter from a left side perspective view, the circular perimeter of the capstan including notches extending radially inward to define one or more cleat shapes in the outer perimeter.

19. The drill powered wire puller of claim 11, wherein a side profile of the capstan, when viewed from a top side view, extends radially inward from a circular perimeter of the capstan, and laterally outward from the support to define a radially symmetrical concave profile that arcs through ninety degrees.

20. The drill powered wire puller of claim 11, wherein the notch of the cradle is configured with a U-shaped notch consistent with a curved portion of the handle of the powered rotary tool.

* * * * *